Sept. 22, 1931.  G. F. MICHOT-DUPONT  1,824,336

FLUID MOTOR

Filed May 13, 1930

INVENTOR
Georges Francis Michot-Dupont
ATTORNEYS
Symmestvedt + Lechner

Patented Sept. 22, 1931

1,824,336

UNITED STATES PATENT OFFICE

GEORGES FRANCIS MICHOT-DUPONT, OF VINCENNES, FRANCE

FLUID MOTOR

Application filed May 13, 1930, Serial No. 452,034, and in Belgium May 14, 1929.

The present invention relates to fluid motors and, more particularly, to those designed to be actuated by the wind.

One of the objects of the invention is to provide a motor having fluid resisting surfaces of a form adapted to convert the rectilinear flow of the wind into a rotatory couple.

Another object is to provide means for regulating the action of the wind motor.

Further objects will appear in the course of the detailed description now to be given with reference to the accompanying drawings, in which:—

Figure 1:
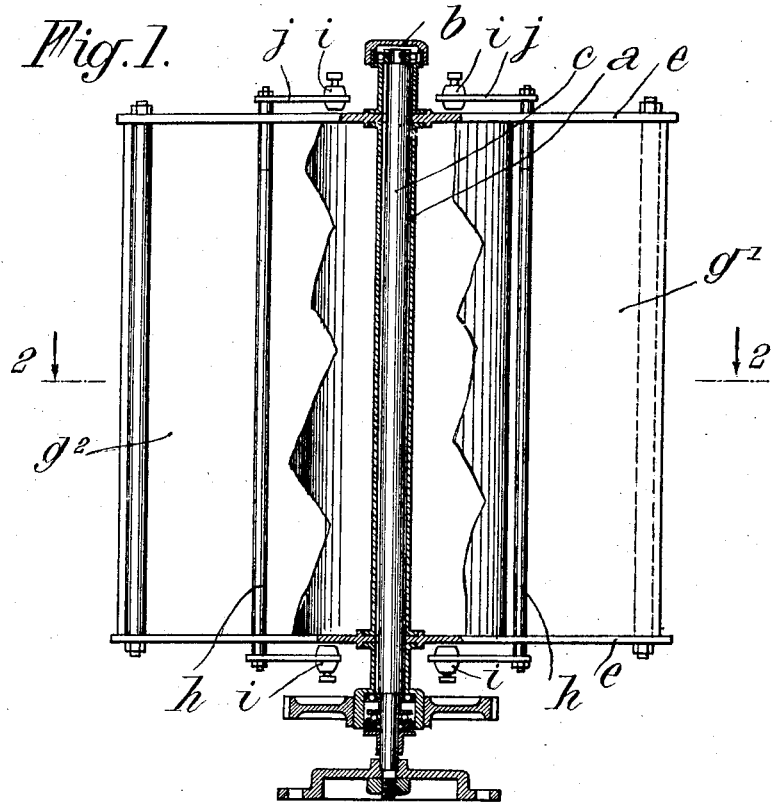
Fig. 1 is an elevation, partially in section, of one illustrative embodiment of the invention.
Figure 2:
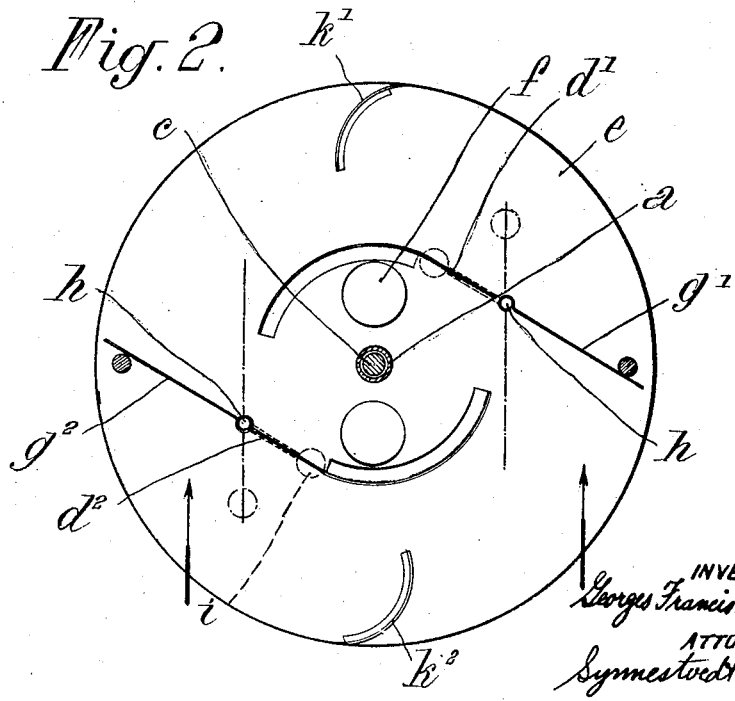
Fig. 2 is a section taken on line 2—2 of Fig. 1.

Referring to the various figures of the drawings, there is shown a central, vertical, fixed, supporting post $c$—a shaft $a$, suspended at $b$ in rotatable relation to post $c$,—a pair of sheet metal surfaces $d^1$, $g^1$ and $d^2$, $g^2$ positioned symmetrically with relation to shaft $a$ and formed so as to present, in section, a curve having one extremity farther from the axis of rotation than the other (the apparatus being in the position shown in Fig. 2), the extremity nearest said axis being substantially concentric therewith (in practice, surfaces $d^1$, $d^2$ are circular, cylindrical quadrants fitted on one side either with a rectilinear extension $g^1$, $g^2$ or with an extension concave relatively to the central axis of the cylinder),—and a pair of end plates $e$, $e$ having orifices $f$, $f$ formed therethrough. Extensions $g^1$, $g^2$ may be formed integrally with surfaces $d^1$, $d^2$ or may be mounted to swing pivotally with relation to the latter in a manner hereinafter to be described.

Assuming $g^1$ and $g^2$ to be integral and continuous with $d^1$ and $d^2$ respectively and surfaces $d^1$, $g^1$ and $d^2$, $g^2$ to be rigidly attached to end-plates $e$, $e$ in the manner of the blades of a water-wheel, the motor will function as follows. The wind blowing in the direction of the arrows shown in Fig. 2 strikes surface $g^1$ and is deflected inwardly along surface $d^1$ back onto surface $d^2$, $g^2$ thus producing a first turning moment on $d^1$, $g^1$ and a second on $d^2$, $g^2$. At the same time element $g^2$ receives the direct impact of the wind on its exterior surface and deflects the latter outwardly. The air deflected into the space between $d^1$, $g^1$ and $d^2$, $g^2$ and whose force has been spent will discharge through orifices $f$, $f$.

It is advisable to regulate the turning effect exerted by, and on surfaces $d^1$, $g^1$ and $d^2$, $g^2$. In such a case these surfaces, instead of being integral and continuous are formed in two sections, a curved portion $d^1$ or $d^2$ concentric with shaft $c$ and rigidly attached to plates $e$, $e$, and a straight portion $g^1$ or $g^2$ pivotally connected to elements $d^1$ or $d^2$ by vertical hinges $h$, $h$ positioned symmetrically with relation to the axis of rotation. A pair of arms $j$, $j$ connected to each of surfaces $g^1$ and $g^2$ carries adjustable weights $i$, $i$ which exert a force, under the centrifugal action of the motor, tending to move these surfaces towards the axis of rotation (dotted line position in Fig. 2), appropriate stops being provided to limit the turning movement of surfaces $g^1$, $g^2$.

From the foregoing it will be evident that if weights $i$, $i$ are properly chosen, the wind resistance offered by extensions $g^1$, $g^2$ will diminish with increasing velocities of the motor and excessive speeds that might deteriorate or destroy the apparatus, in time of storm, will be prevented.

To cause the motor to begin to rotate even if it has stopped in such a position that the action of the wind on surfaces $d^1$, $g^1$ equiliberates that on surfaces $d^2$, $g^2$, a pair of auxiliary sheet metal surfaces $k^1$, $k^2$ may be provided extending between end plates $e$, $e$, said auxiliary surfaces being positioned at equal distances between surfaces $d^1$, $d^2$ and symmetrically with relation to shaft $a$ and being formed so as to present, in section a line having one extremity farther from the axis of rotation than the other.

What I claim is:—

1. In a fluid motor, a fixed support, and a rotatable assembly mounted on said fixed support and comprising a rotatable supporting element, and a fluid-resisting element having a surface presenting, in section, a line having one extremity farther from the axis of rotation of the rotatable assembly than the other, the extremity nearest said axis of rotation being substantially in the form of a circular arc struck off with the axis of rotation as a center and positioned in spaced relation to the latter.

2. A structure as defined in claim 1, in combination with a second fluid resisting element of like form to that of the first fluid-resisting element and positioned in symmetrical relation thereto relatively to the axis of rotation of the rotatable assembly.

3. In a fluid motor, a fixed support, and a rotatable assembly mounted on said fixed support and comprising, a first fluid resisting element having a portion of its surface positioned at a constant distance from the axis of rotation of the rotatable assembly and concentric with said axis, and a second fluid resisting element having a surface movable with relation to said axis of rotation.

4. In a fluid motor, a fixed support, and a rotatable assembly mounted on said fixed support and comprising a rotatable supporting element, a first fluid resisting element rigidly mounted on said supporting element and having a surface presenting, in section, a line in the form of a circular arc struck off with the axis of rotation as a center and lying concentric with said axis, and a second fluid resisting element pivotally supported on said rotatable supporting element and having a plane surface.

5. A structure as defined in claim 4 in combination with a rod connected to said second fluid resisting element and extending beyond the pivotal axis thereof, and a weight mounted on said rod.

6. In a fluid motor, a fixed support, and a rotatable assembly mounted on said fixed support and comprising a rotatable supporting element, a first fluid resisting element rigidly mounted on said supporting element and having a surface presenting, in section, at least in part, a line in the form of a circular arc struck off with the axis of rotation as a center and lying concentric with said axis, a second fluid resisting element pivotally supported on said supporting element, weight supporting means connected to said second fluid resisting element and extending beyond the pivotal axis thereof, and a weight mounted on said weight supporting means.

In testimony whereof I affix my signature.

GEORGES FRANCIS MICHOT-DUPONT.